R. KEEGAN.
NUT LOCK.
APPLICATION FILED OCT. 18, 1909.
951,078.
Patented Mar. 1, 1910.
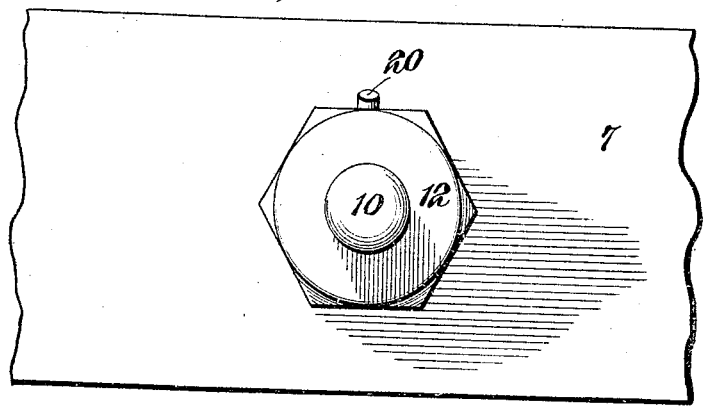
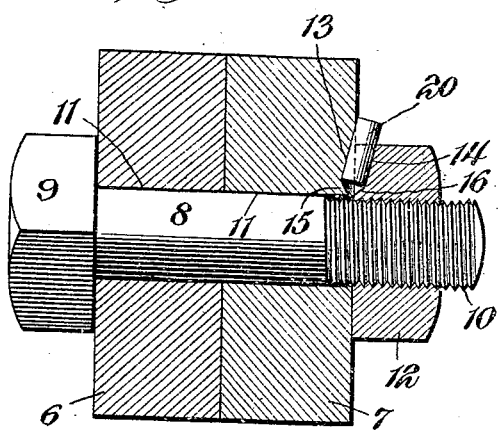
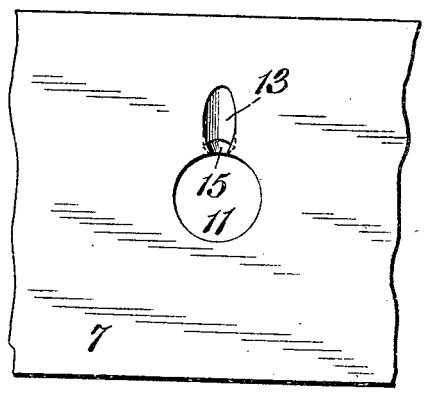
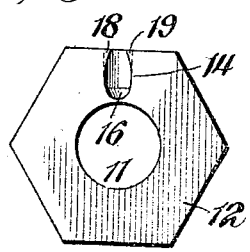
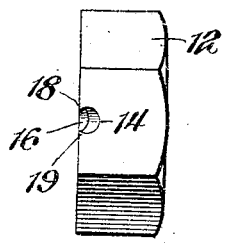
Witnesses
Howard D. Orr
George Tate
Richard Keegan, Inventor,
By E. G. Siggers,
Attorney

UNITED STATES PATENT OFFICE.

RICHARD KEEGAN, OF BISHOP'S MILLS, ONTARIO, CANADA.

NUT-LOCK.

951,078.  Specification of Letters Patent.  Patented Mar. 1, 1910.

Application filed October 18, 1909. Serial No. 523,303.

*To all whom it may concern:*

Be it known that I, RICHARD KEEGAN, a citizen of the United States, residing at Bishop's Mills, Province of Ontario, Canada, have invented a new and useful Nut-Lock, of which the following is a specification.

This invention relates to an improvement in nut locks, and has for its object to provide a simple, inexpensive and efficient one of great strength and durability, adapted to be readily applied to an ordinary bolt without necessitating any alteration in the construction thereof, and capable of effectually preventing a nut from accidentally unscrewing, when subjected to vibration and rattling incident to its use on rail-joints, machinery and the like.

In the drawing:—Figure 1 is a view in elevation showing my invention in use. Fig. 2 is a cross-sectional view of the same, the bolt and locking pin being shown in elevation. Fig. 3 is a front elevation of the plate, showing the perforation for receiving a portion of the locking pin. Fig. 4 is an inner face view of the nut showing the perforation for receiving a portion of the locking pin. Fig. 5 is a side view of the nut showing the perforation therein.

Like reference numerals designate corresponding parts in all the figures of the drawing.

Referring to the drawing, the bolt 8 having a head 9 and a threaded end 10 is passed through the alined openings 11—11 in the sections or plates 6 and 7, and a clamping nut 12 is screwed onto the threaded end of the bolt. After the nut has been screwed home, the point of a drill is positioned on one side of the nut at a point near the base or inner face of the nut, and at a distance therefrom less than the radius of the drill. An inclined circular opening is then drilled, a portion 13 thereof being formed in the plate section or base plate 7, and the other portion 14 in the nut 12. This opening preferably terminates short of the bolt opening 11 of the section or plate 7, and because of the shape of the drill, bottom flanges 15 and 16 are simultaneously and respectively formed in the section 7 and the nut 12. It will thus be noted that the portion 13 of the said opening or perforation in the base is deepest at its inner end, and from said inner end of the portion 13 the flange 15 inclines outward and upward, while the portion 14 in the nut has its depth greatest at the outer end or at the side of the nut. It will also be observed that the portion 13 of the perforation commences at a point some distance above or beyond the top or side of the nut. This is caused by centering the drill, as before described. By centering the drill in this manner, the portion 14 of the opening in the nut is formed with oppositely extending corners 18 and 19 respectively, which are spaced apart a distance less than the diameter of the said perforation. A pin 20, is preferably formed of steel wire, is cylindrical in shape, and is a trifle less in cross sectional area than the said opening but of greater length so as to project beyond the nut, as shown. This pin is inserted in the said aperture when the two portions 13 and 14 are brought in alinement, and the nut is given a slight movement in a backward direction. This movement of the nut causes the corner 18 to engage the said pin and lift the outer end outwardly or upwardly a short distance, throwing the inner end of the pin downwardly or inwardly. In this action there is a tendency of the pin to roll slightly. This results in the perforation becoming distorted; *i. e.*, the partial perforation in the nut is moved out of alinement with the partial perforation in the base plate. Such movement of the nut will clamp the said pin against the outer edge of the adjacent side wall of the portion 13 of the perforation, and thereby prevent any rotation of the nut. It will be observed that, inasmuch as the portion 13 of the opening terminates short of the bolt, the pin 20 will not come in contact with, and mutilate the threads of the bolt. It will also be noted that by inclining the opening, the lock can be readily applied to a nut and rail without the necessity of employing a washer. Furthermore, by reason of the fact that the opening terminates short of the bolt, and consequently prevents the pin from engaging the threads thereof, the pin is permitted to roll slightly upon the movement of the nut. In order to loosen the said pin preparatory to the unscrewing of the nut, it is only necessary to turn the nut slightly in the opposite or forward direction until the pin has become disengaged from the said portions of the perforation.

The movement of the nut to release the pin is less in extent than the movement necessary to lock the nut.

When the nut lock is used on rail joints, the section 7 will correspond with the fish plate of the joint.

Having thus fully described my invention, what I claim as new and desire to secure by Letters Patent, is:—

In combination with a base and a nut having an inclined perforation, formed partially in the base and partially in the nut, and having a continuous diameter throughout its entire length, the perforation in the nut beginning at one side and extending through to the base thereof, thereby intersecting the corner of the nut, the perforation in the said base beginning at a point beyond the nut and extending inwardly in alinement with the perforation of the nut to a point near and terminating short of the bolt, the perforation having its greatest depth in the nut at the outer end and in the base at the inner end, a cylindrical pin arranged within the perforation and extending beyond the nut, and having its inner end out of engagement with the threads of the bolt, whereby the pin is permitted to be slightly rolled upon the rotation of the nut, said pin being adapted to be clamped by and between the adjacent side edges of the perforation between the nut and the base to prevent the turning of said nut.

In testimony, that I claim the foregoing as my own, I have hereto affixed my signature in the presence of two witnesses.

RICHARD KEEGAN.

Witnesses:
 DANIEL W. MULLIGAN,
 ETHEL M. MERRITT.